(12) United States Patent
Reay et al.

(10) Patent No.: US 6,882,979 B1
(45) Date of Patent: Apr. 19, 2005

(54) GENERATING REVENUE FOR THE USE OF SOFTGOODS THAT ARE FREELY DISTRIBUTED OVER A NETWORK

(75) Inventors: C. Phillip Reay, Seattle, WA (US); Geoffrey P. Coco, Seattle, WA (US)

(73) Assignee: Onadine, Inc., Seattle, WA (US)

( * ) Notice: Subject to any disclaimer, the term of this patent is extended or adjusted under 35 U.S.C. 154(b) by 0 days.

(21) Appl. No.: 09/336,611

(22) Filed: Jun. 18, 1999

(51) Int. Cl.$^7$ .............................................. G06F 17/60
(52) U.S. Cl. .............................. 705/26; 705/51; 705/57
(58) Field of Search ..................................... 705/26, 27

(56) References Cited

U.S. PATENT DOCUMENTS

| | | | | |
|---|---|---|---|---|
| 5,103,476 A | * | 4/1992 | Waite et al. | |
| 5,166,886 A | * | 11/1992 | Molnar et al. | |
| 5,199,066 A | * | 3/1993 | Logan | |
| 5,260,999 A | * | 11/1993 | Wyman | |
| 5,490,216 A | * | 2/1996 | Richardson, III | |
| 5,509,070 A | * | 4/1996 | Schull | |
| 5,564,038 A | * | 10/1996 | Grantz et al. | |
| 5,579,479 A | * | 11/1996 | Plum | |
| 5,598,470 A | * | 1/1997 | Cooper et al. | 713/165 |
| 5,629,980 A | * | 5/1997 | Stefik et al. | |
| 5,745,678 A | * | 4/1998 | Herzberg et al. | 713/200 |
| 5,753,843 A | | 5/1998 | Fay | 84/609 |
| 5,794,217 A | * | 8/1998 | Allen | 705/27 |
| 5,883,955 A | * | 3/1999 | Ronning | |
| 5,918,213 A | * | 6/1999 | Bernard et al. | |
| 6,151,707 A | * | 11/2000 | Hecksel et al. | |
| 6,195,432 B1 | * | 2/2001 | Takahashi et al. | |
| 6,266,774 B1 | * | 7/2001 | Sampath et al. | 713/201 |
| 6,385,596 B1 | * | 5/2002 | Wiser et al. | 705/51 |
| 6,418,421 B1 | * | 7/2002 | Hurtado et al. | 705/54 |

FOREIGN PATENT DOCUMENTS

| | | | | | |
|---|---|---|---|---|---|
| AU | | 9954964 A | * | 4/2001 | G06F/12/00 |

OTHER PUBLICATIONS

Carrano et al "Data Abstraction and Problem Solving with C++", second edition, Aug. 1998, pp. 15–18 and 22–24.*

(Continued)

*Primary Examiner*—Wynn W. Coggins
*Assistant Examiner*—Naeem Haq
(74) *Attorney, Agent, or Firm*—Ronald M. Anderson

(57) ABSTRACT

An on-line electronic commerce transaction for facilitating purchase of digital products (softgoods) after enabling a user to preview the softgoods. Creators of the softgoods enter into an agreement with an e-commerce agency in which the agency agrees to handle sales of the softgoods and to return a portion of the revenue to the creators. Creators are provided with a softgood authoring tool that automates the softgood creation process. Before the softgoods are distributed, a unique identifier is included in the softgood by this authoring tool. To play a softgood, a prospective purchaser downloads or otherwise acquires a player program. The player program enables a prospective purchaser a limited preview of each softgood. If a user decides to purchase a softgood, the player program communicates with the e-commerce agency over the Internet to facilitate the purchase transaction. During this transaction, the prospective purchaser is prompted to enter a financial account number. The player program encrypts this account number and other data transmitted to the e-commerce server, unless the prospective purchaser's credit card information and other personal data are already stored in a database maintained by the e-commerce server. The validity of the credit transaction is confirmed with an appropriate approval agency, and if approved, a registration value is provided to the player program for use in registering the softgood on the user's computer. If the softgood has not been purchased and registered on the user's computer, it will not be played by the player program beyond the permitted preview.

41 Claims, 5 Drawing Sheets

OTHER PUBLICATIONS

No Author, "Computer Dictionary", Microsoft Press, second edition, 1994, p. 91.*

Rinearson, Peter "Word Processing Power with Microsoft Word", second edition, 1986, p. 54.*

Williams, Alan "CS3111 Module Concurrency", Department of Computer Science, University of Manchster, no publication date.*

Korth et al "Database System Concepts", McGraw–Hill, Second Edition, 1991, pp. 30–33, 57–59.*

No Author: "DPAS: Revolutionary Online Software Registration Product, CyberReg, Offers Higher Return Rates and Increased Revenues", Newswire, Jun. 4, 1997, Retrieved from Dialog File: 16, Accession No.: 05070634.*

No Author, "Microsoft Press Computer Dictionary", Microsoft Press, Third Edition, 1997, pp. 425–426.*

* cited by examiner

GENERATING REVENUE FOR THE USE OF SOFTGOODS THAT ARE FREELY DISTRIBUTED OVER A NETWORK

FIELD OF THE INVENTION

The present invention generally pertains to a method and system for generating revenue through electronic commerce (e-commerce) transactions conducted over a network, and more specifically, to a method and system for registering digital products at a site, distributing the digital products freely, arranging for the sale of the digital products through transactions conducted over a network such as the Internet, and collecting and distributing revenue generated by the sales.

BACKGROUND OF THE INVENTION

With the increasing growth in popularity of the Internet, it has become a relatively common occurrence to purchase books, software, music compact disks (CDs), etc. through transactions in which the user provides a credit card number and shipping/billing address to an on-line merchant, who then ships the goods to the purchaser. In the case of software sold over the Internet, the prospective purchaser may be permitted to download a demo version of the software for preview. The demo version typically is either not fully functional (e.g., it is unable to print or store a file created with the software) or can only be used for a defined limited time after being installed on the user's computer. If the prospective purchaser is pleased with the performance of the software product in demo form, a fully functional version of the software will likely be purchased. To avoid requiring the user to download a second fully functional version, the software distributor or vendor often provides the user with a registration number or key that enables the full functionality and unlimited time use to be achieved by unlocking the demo version originally downloaded, thereby effectively converting the demo version of the software product to a fully functional version.

For the distribution and sale of application software over a network, the above-described approach serves reasonably well. However, it is less useful when the digital product that is being distributed is a creative work product resulting from the application of artistic skill. In such cases, the originating author often does not have the needed software skills to implement complex software copy protection schemes. Also, such softgoods require additional software to experience the digital product when the digital product is downloaded to a new computer. Examples of such digital products, which are referred to herein as "softgoods," include music files that can be played on a computer provided with a sound card and sound system using an appropriate player program, graphic art that be displayed on a computer monitor, perhaps interactively responding to sound or other data/sensor input, and other types of audio visual works that are playable on a computer with the appropriate software. Although softgoods will typically be licensed to a user, the license to use a softgood would most likely be sold to a user, rather than a fee title to the softgood. Accordingly, as used herein and in the claims that follow, it will be understood that the "sale or purchase of a softgood" is intended to implement either a transfer of all rights and title in a softgood, or to grant rights to use a softgood under a license.

Clearly, there are many types of softgoods that might be more efficiently distributed over the Internet or via almost any other channel of distribution and sampled by potential purchasers, if a more effective procedure were provided to enable the softgoods to be previewed, and if acceptable to the user, purchased using the same program required to play the softgood. Copying of softgoods and exchange of the copies by prospective purchasers could then be encouraged to facilitate exposure of the creative works to the largest possible audience. However, it is not intended that softgoods be given away. Once a prospective purchaser has previewed a softgood, any further use of the softgood on that party's computer should be precluded unless the softgood is first purchased.

Depending upon the nature of the softgood, the player program used, and other factors, there may be many ways to limit the scope of a preview of a softgood. For some types of softgoods, it may be desirable to provide an optimum first impression, and thus, a user should preferably be enabled to fully experience the softgood by playing it on an appropriate player program. After this initial first impression, it may be desirable to limit the quality of the softgood during any further preview of the work by that user, for example, by enabling the softgood to be played in a window of limited size, or at a limited resolution, or with fewer colors, or with audio only, or video only. It may also be desirable to enable a demonstration of the softgood, but not the full scope of the softgood, to be experienced using a general purpose multimedia player program (rather than a player program normally used to fully experience the softgood). For other types of softgoods, the first impression may be less important, and the preview may be limited in duration, number of preview plays, length of preview play, quality (size of window, resolution, number of colors, etc.), or in other ways, so that the user is encouraged to purchase the softgood to overcome the preview limitation.

It would be desirable to provide a service that (1) enables those who have created or modified softgoods to readily distribute them to prospective purchasers connected through a network like the Internet; and, (2) permits prospective purchasers to sample and preview softgoods and, at their option, purchase the softgoods. A service achieving these functions could thus provide a system to facilitate the distribution and sale of softgoods and tracks each purchase of a softgood in return for a portion of the purchase fee. Such a service would distribute part of the proceeds of each sale of a softgood to the party who created it, and would create and maintain a database in which each such transaction is recorded. A creator of a softgood, although not directly involved in the transaction, would receive revenue from each purchase of a copy of that softgood. Such a service would free the creator of a softgood from the burden of administering purchase transactions and softgood distribution.

Any service that facilitates the purchase of softgoods would also likely connect on-line with a credit card, debit card, or similar digital transaction approval agency during a purchase transaction, to ensure that a purchaser's credit is valid and that the transaction is approved before providing a registration identifier to register the softgood on a purchaser's computer.

For some types of softgoods, a purchaser may wish to make changes in the work, resulting in a derivative work. The author or composer's name, contact information for the author or composer, date of creation of the work, purchase price, and other relevant information about the softgood should be retained within each softgood, even if a purchaser is enabled to modify the softgood to produce such a derivative work. Furthermore, as an option, the creator of a softgood should be able to selectively preclude a user from making changes to the softgood, to preserve the integrity of a composition embodied therein.

As noted above, it would also be desirable to associate a purchase price with a softgood and to retain this purchase price within the softgood. However, since the value of a softgood can change over time, a mechanism should be provided for adjusting the initial purchase price as necessary to reflect the current market value of the softgood. Currently, the features noted above are generally not provided in the prior art.

Artistically creative people who develop softgoods should be freed of the burden of distributing and selling their works. Clearly, a system like that discussed above that promotes the free and widespread circulation of softgoods, facilitates their sale, and provides for a proportional distribution of revenue to the creators of the softgoods from each such sale should greatly minimize this burden. To facilitate tracking of softgoods through the distribution, preview, and purchase process, each softgood should be internally provided with a unique identifier. This unique identifier can simplify the billing, payment, and revenue distribution process. In addition, reference to the unique identifier can provide means for tracking the use of softgoods and of any derivative works, thereby encouraging the purchase of such derivative works.

SUMMARY OF THE INVENTION

In accord with the present invention, a method is defined for facilitating automated sale of softgoods from which a revenue stream is returned to creators of the softgoods. Softgoods are created using a program that automatically includes a unique identifier in the softgood before distribution of the softgood to prospective purchasers. The creators enter into a contract with an e-commerce agency in which the agency will be responsible for selling the softgoods produced by the creators. The e-commerce agency has a server that maintains a database in which data related to the sale of softgoods are stored. Softgoods are freely distributed to prospective purchasers over the Internet or other network, or via distribution of memory media on which the softgood is stored. Automated purchase of the softgoods is enabled through an on-line transaction with the e-commerce agency, which logs information related to the purchase of a softgood in the database in association with the unique identifier for the softgood that is being purchased, and produces a registration value that is provided to the purchaser for registration of the softgood on the purchaser's computer.

Another aspect of the present invention is directed to a method for controlling play of a softgood on a computer using a player program. This player program is also employed to purchase the softgood through a transaction conducted over a network such as the Internet. The player program may take various forms and have various other functions in addition to its primary functions of controlling the play of softgoods and enabling their purchase.

A user is enabled to preview a softgood on a computer using the player program; however, the preview of the softgood is limited. For example, the softgood can be played for only a predefined number of times or used for only a predefined time interval during the preview, or with a lower quality than would otherwise be provided. If the softgood appears to be a desirable product, the user is enabled to purchase the softgood in a transaction conducted with the e-commerce server from within the player program. After the user has purchased the softgood, the player program registers the softgood on the user's computer, with the registration value provided during the purchase transaction. Registration of the softgood on the purchaser's computer provides the purchaser full access to the softgood so that it is playable on the computer using the player program without the preview limitation.

If the softgood is subsequently transferred to a different computer after being purchased, it will be necessary to again register the softgood on the different computer to enable the softgood to be played for more than the permitted preview.

Preferably, the registration identifier includes at least one of a product identifier for the softgood, an identifier for a creator of the softgood, an identifier for the player program, and a user identifier that indicates the purchaser of the softgood.

The method further preferably includes the step of confirming that a credit card or other credit transaction authorization of a prospective purchaser is valid before concluding the purchase transaction. This step is implemented by checking the number of the credit card (or other financial account authorization) with an appropriate approval service over the network during the transaction. If the credit card (or other financial account authorization) is valid and approved, the registration value is transmitted to the purchaser to facilitate the transaction by registering the softgood on the purchaser's computer. Conversely, if the financial account authorization is invalid, or disapproved, the prospective purchaser is so advised.

The method also preferably includes the step of maintaining a database in which data concerning purchases of softgoods are stored. These data include an identification of each purchaser and the softgoods purchased by each purchaser. The data stored in the database also preferably include a financial account number (e.g., a credit card number) for each purchaser of softgoods. The financial account numbers are provided by the purchasers and can be charged during a transaction to purchase a softgood. It may be desirable to enable a user to encrypt a financial account number in a secure form, for transmittal over the network to be included in the database. If so, the player program is preferably used to encrypt the financial account number during a first purchase by that purchaser. In addition, the database also optionally includes a current price for softgoods that have been distributed, and a prospective purchaser is advised of the current price of the softgood being purchased during the transaction.

Generally, the player program is employed to transmit information relevant to the purchase of a softgood over the network to implement purchase of a softgood. A secure socket layer or any other secure transaction mechanism may be used to minimize the chance that the information might be intercepted by a third party. Alternatively, although less desirable, a separate browser program can be used to implement the transaction over the network.

Another aspect of the present invention is directed to a system for facilitating purchase of a license to use a softgood of which copies or derivative works are freely distributed to prospective purchasers for preview prior to purchase. The system includes a purchaser computer and a remote computer. Memory in each computer stores machine instructions, which when executed by a processor, carry out functions consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention is directed to an e-commerce architecture system for implementing the distribution and marketing of digital goods that are created by one or more individuals. Throughout this specification and in the claims that follow, such digital goods are referred to as "softgoods." While the present invention is not limited to softgoods of an artistic nature, in an initial preferred application of the present invention, it is anticipated that the invention will be employed for marketing and facilitating the purchase of softgoods that comprise compositions created using a Composer program. A player program is then subsequently used to automatically register softgoods created by the Composer program with an agency having an e-commerce server programmed to handle each sale of a softgood and maintain a database in which information about softgoods and about creators and purchasers of the softgoods is stored. As used herein and in the claims that follow, it will be understood that the "player program" can be distributed either as a separate program or alternatively as part of the softgood or as a program module included therewith. The Composer program itself might be so distributed. Its compositions are typically played on a computer with the player program that is separately distributed (or included as part of the softgood), or can also be played and modified by a user (e.g., other than the original creator of the softgood) with the Composer program or by altering inputs to the softgood. When one of these softgood compositions created with the Composer program is played by the Composer program or by the player program, a "dynamic visual dance," for example, is created that flows in cadence and in response to an audio signal that is input to the user's computer through a soundcard or another audio source. The user can interact with the softgood with almost any other input, such as by moving a pointing device or mouse, or by entries on the keyboard. This particular type of softgood is thus a composition or arrangement created by the Composer program and responds to music or other audio input signals in a specific manner, as determined by the creator of the composition, providing a visual graphic display that varies dynamically with the audio signal and changes dynamically with the signal. Because of the expressive range and number of parameters and controls included in the Composer program, each arrangement or composition created can be substantially different in its response to an audio signal and/or other inputs. Further details of these compositions and of the Composer and player programs are disclosed in commonly assigned U.S. patent application Ser. No. 08/935,618, entitled "Real-Time Multimedia Visual Programming System," filed on Sep. 23, 1997, the specification and drawings of which are hereby specifically incorporated herein by reference.

Figure 1A:
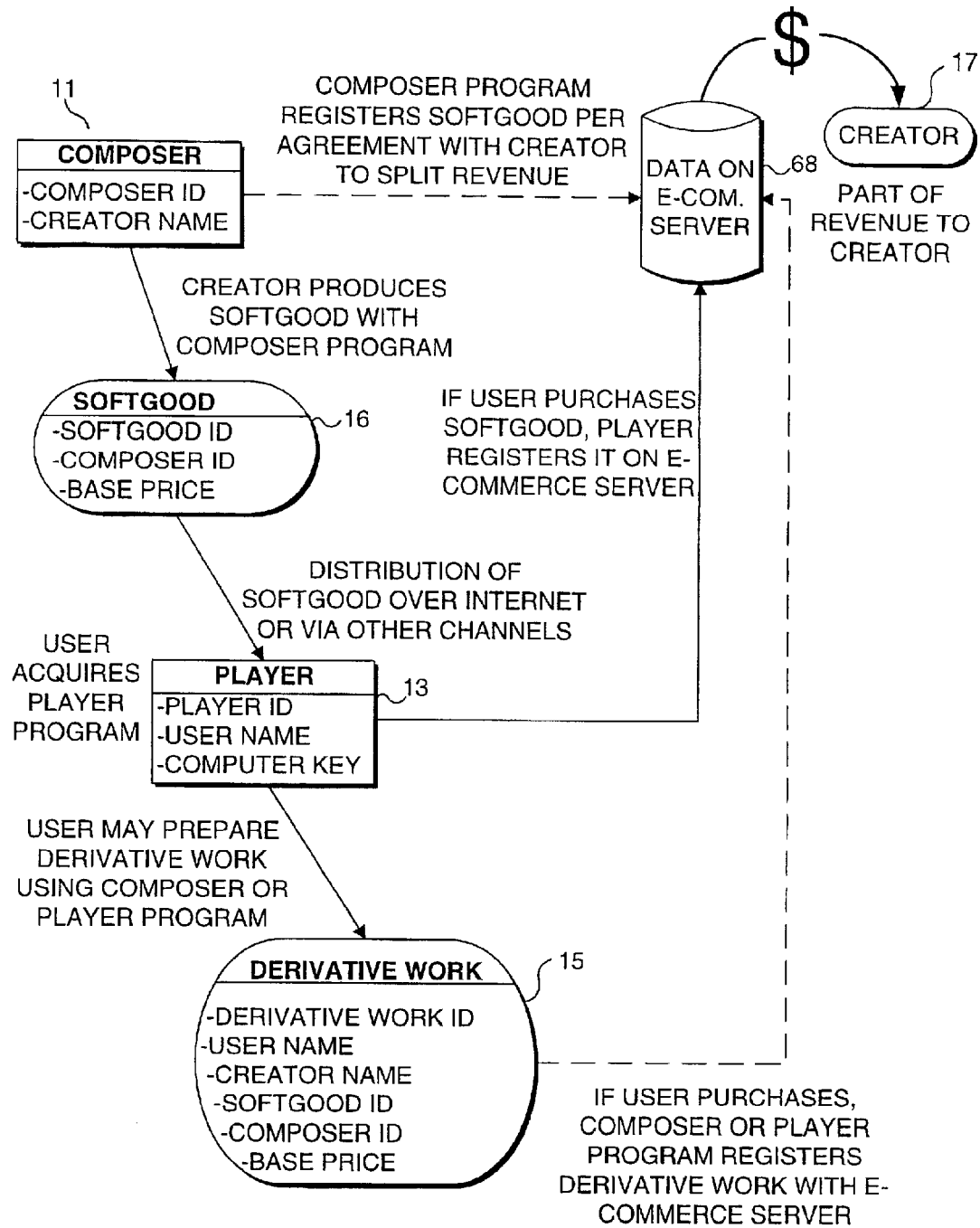
FIG. 1A is a schematic block diagram of a preferred embodiment of the present invention that provides a system to enable a creator of a softgood to register the softgood with an e-commerce server and receive revenue for each sale of the softgood.

Further details of the system implemented in an initial application of the present invention are shown in FIG. 1A. A creator 17 must have purchased or otherwise have obtained the Composer program and will have entered into an agreement with the agency that will be responsible for handling the sale of softgoods produced by the creator, thereby freeing the creator from this burden. The terms of this agreement will set forth the portion of the revenue from each sale of the softgood that will be provided to the creator of the softgood. Upon entering into this agreement, a composer identification (ID) 11 that references the creator by name and the Composer program by serial number or other unique value will be entered into a database 68 maintained by the agency's e-commerce server, thereby registering the Composer program.

The Composer program running on the creator's computer is used to produce a softgood 16. Each softgood 16 has a softgood ID associated with it, comprising the composer ID for the Composer program used to produce the softgood, and a unique serial number generated by the Composer program (or optionally generated by the e-commerce server). This and other data unique to the softgood, such as creator information, modification history, operating instructions, and a base price, are included within the softgood, e.g., within a header of the softgood. At the time of the creation of the softgood, its softgood ID and the associated information noted above may optionally be transferred electronically over the Internet or other network for entry into database 68 on the e-commerce server, but preferably, the softgood ID and associated information will instead be entered into database 68 by the e-commerce server when the softgood is purchased.

In this initial application of the present invention, the compositions comprising the softgoods produced by the Composer program will be freely distributed for preview by prospective purchasers. The distribution will likely be over the Internet, and/or on magnetic media such as floppy disks, and/or on optical storage media such as CD-ROMs, and/or on other storage media such as DVD disks. The player program used to play these softgoods will also be distributed over the Internet (or other network) from one or more web sites and will be registered to each party that downloads it by storing a player ID 13 that is associated with a user name and a computer (or machine) key for the computer on which the player program is running when registered in database 68, e.g., when connected with the e-commerce server over the Internet or other network, or via a telephone call. The player program can also be distributed on any of the storage media noted above, and likely will be provided without charge. A more powerful version of the player program having additional features and functions may be provided and sold, and a player ID and associated user name and computer key for it will also preferably be stored in database 68. However, it is expected that revenue for the agency handling purchase of the softgoods will be generated through the sale of the Composer program and more importantly, through the purchase of softgoods for use with the player program. A percentage of the revenue from each sale of a softgood handled by the e-commerce server will be retained by that agency, while the remaining revenue will be distributed to the creator of that softgood and/or other parties, in accord with the terms of the agreement executed with the creator of the softgood.

A purchaser of a softgood may modify it from its original form (unless precluded by the creator of the softgood, i.e., in the license granted to the purchaser and by a setting made in the Composer program when the softgood was originally produced by the creator) using the Composer program. Also, digital "movies," still images, and audio recordings can be produced by capturing a portion of the output of the player program to produce another type of derivative work. Each derivative work will likely include a derivative work ID 15 that is associated with the user name of the person modifying the softgood, the creator's name, the softgood ID, the Composer ID of the Composer program originally used to produce the softgood, and the base price of the softgood. The Composer or the player program used to produce the derivative work will enable the user to voluntarily register the derivative work in connection with the above-noted information in database 68 on the e-commerce server, so that subsequent users of the derivative work softgood may voluntarily purchase it by a transaction with the agency, thereby also providing a revenue stream for the derivative work softgood to both the agency and the creator of the original softgood. The license for the softgood granted by the creator to the user who modified the original softgood to produce the derivative work softgood may (legally) require that the derivative work ID and associated information be transmitted over the Internet or other network to the e-commerce server for storage in its database, before the derivative work softgood is distributed to others. As noted above, derivative work softgoods that may be produced include not only modified softgoods, in which parameters have been changed by the user, but also, for example, a display screen captured at a point during the play of the softgood, or a video track (digital movie) captured during play of a softgood, or sound files, or other artifacts of the player program or Composer program processes captured during the play of a softgood.

While this initial application of the present invention is specific to a particular type of softgood, it is not intended that the present invention in any way be so limited, since it is also applicable to many other types of softgoods. For example, musical compositions, graphic works, motion picture special effects tools, written works, real time process control, environmental control systems, or combinations of audio and visual works can also be distributed and sold in accordance with the present invention.

Figure 1B:
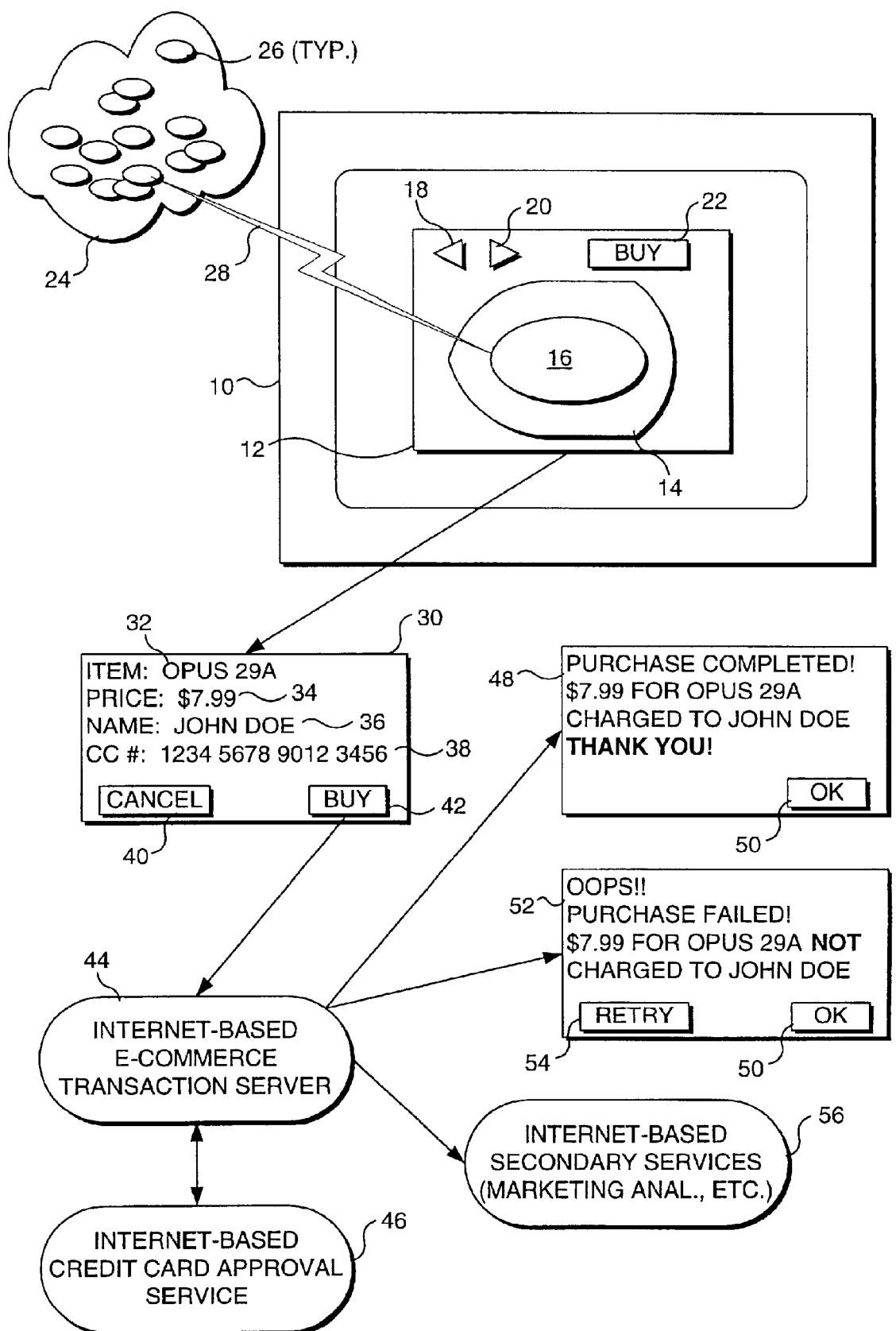
FIG. 1B is a schematic block diagram showing the functional components of the system that enable a user to preview and then purchase a softgood.

With reference to FIG. 1B, a schematic diagram illustrates how the present invention will be implemented to enable an e-commerce transaction for purchase of a softgood to occur over the Internet or other network. As noted above, this paradigm presumes that softgoods are readily distributed through a variety of distribution channels to encourage users to preview the softgoods before they are purchased. A user wishing to preview and possibly purchase a softgood will have previously downloaded or otherwise acquired the player program and installed it upon the user's computer. Alternatively, other types of multimedia viewing programs may be employed to run a demo of the softgood. Ideally, when the prospective purchaser attempts to play a softgood, but has not yet purchased the player program, a dialog will open with a network address and an invitation to click on the address to visit a web site where the player program can be downloaded. The player program will be required to enjoy the full benefits of a softgood.

A monitor 10 illustrates a window 12 displaying a play screen 14 in which softgood 16 is currently being previewed with the player program. In this example, the player program is used to load and play a single selected softgood, or it can load softgoods from a list of softgoods that are stored on the user's computer, which is conveniently accessed from within the player program. Accordingly, a reverse button 18 and a forward button 20 are provided within window 12 to respectively enable the user to load a previous softgood in the list, or to advance to the next softgood in the list. Also included within window 12 is a control 22 labeled "BUY," which the user may activate when a decision is made to purchase a softgood.

It is contemplated that the user will have downloaded or otherwise obtained softgood 16 via an Internet connection 28 from a web site 24 (e.g., a file transfer protocol (FTP) site) at which a plurality of softgoods 26 are provided for downloading by any user connecting to the site who wishes to preview selected softgoods that are available. Once downloaded, the softgoods can be previewed in order on a list, or alternatively, only a single selected softgood can be downloaded and previewed with player 14. The user playing softgood 16 is enabled to enjoy a limited preview. The limitation on the preview may permit the user to play the softgood only a predefined number of times, e.g., three times, on a specific computer, or preview it for a predetermined time limit, e.g., for ten minutes, or over a period of 24 hours, but other types of limitations on the preview are contemplated. For example, a preview may limit the resolution with which the softgood is displayed, or otherwise limit the quality with which the softgood plays until it is purchased. It may be preferable to enable one full play at full quality and then limit the quality of the softgood for subsequent plays on that computer, under the philosophy that the first full quality play is most likely to motivate the user to purchase the softgood.

Assuming that the user chooses to purchase the softgood, control 22 is activated in the conventional manner, i.e., by moving a cursor over the control so that it is selected with a mouse or other pointer button (not shown), or by pressing a related key on the user's keyboard that activates control 22. Activating control 22 opens a dialog 30 on monitor 10. Dialog 30 identifies softgood 16 by a title 32, and indicates a base price 34 for the softgood, which is updated to a current price (if different) when the player connects to the e-cornmerce server. Title 32 and base price 34 are included within the softgood, for example, as part of its header. In some cases, it is likely that the current price of a softgood may vary from the base price over time. For example, the price of a softgood may decrease over time, as its novelty and consumer interest wanes.

In addition, dialog 30 also includes a region 36 for entering the name of the user that appears on the credit card or other debit account being used to purchase the softgood. The user also enters a credit card number or other financial account number 38 to which the purchase price of the softgood should be charged, unless this financial information has previously been provided to the e-commerce server via an earlier transaction wherein the user has been registered into the system and the server has stored the user's credit information within its database. For example, it is contemplated that at the time the player program is registered, the user may provide a credit card or other financial account number against which all future purchases of softgoods should be charged. In such cases, during the transaction to purchase a softgood, the user may only need to confirm that the purchase price should be debited to the previously provided credit card account. Alternatively, the user may provide a credit card or other financial account number to the e-commerce service agency for inclusion in its database by telephone, for example, by calling an 800 number —either when registering the player program or at some other time, such as when a first softgood is purchased by the user. The financial account number is not limited to just a credit card number, since other types of financial accounts may be debited for the purchase price, e.g., a debit card account number may be provided to debit a user's checking account for the purchase price.

The user may elect to cancel the transaction by activating a control 40, but more commonly will confirm their decision to purchase the softgood by activating a control 42. Upon activating control 42, the information shown in dialog 30 is transmitted through an Internet protocol, such as the Transmission Control Protocol/Internet Protocol (TCP/IP) connection, over the Internet to the e-commerce service agency handling the transaction. If a credit card or other financial account number is included in the transmission from the player program to the e-commerce server, the player program will encrypt the transmission to minimize the risk that a third party may intercept it and gain access to the user's credit card information. The player program preferably encrypts this transmission automatically, in response to entry of a credit card or other financial account number in the dialog, so that the user is not involved in even making the decision to encrypt the transmission.

A block 44 in FIG. 1B indicates that the transmission is sent over the Internet (or other network) to the e-commerce server, which decrypts the transmission (if encrypted). Also included in the transmission, although not evident to the user, is a user identification that provides the user's name, for association with the credit card or other financial account number. The e-commerce server automatically connects to a credit card or other financial account approval service over the Internet (or over an alternative network), as indicated in a block 46, to determine if the user's financial account number is valid and if the transaction is approved. The communication between the e-commerce server and the approval service is preferably conducted through a secure socket layer (SSL) connection or other secure connection to ensure the security of the data being transmitted between the two entities by preventing interception of the communication by a third party.

Assuming that the transaction is approved by the approval service, the e-commerce server logs the transaction and information provided by the player program in its database and transmits a unique registration value called the softgood registration ID to the player program running on the user's computer. In the preferred embodiment of the present invention, this unique softgood registration value or ID is produced by combining the softgood ID for the softgood being purchased with the player ID and with the name and identification information for the user making the purchase, which is available from the database on the server. Thus, multiple ID's for different elements of the process are combined to yield a unique softgood registration value or ID that identifies the user, the computer on which the softgood was purchased and registered, and which enables a legitimate use of the softgood by that user on that computer. The registration value or ID for a softgood may be encrypted, or encoded by logically combining binary values for these three variables. In addition, the softgood registration value or ID is also preferably e-mailed to the user for retention in the user's records, for use during system maintenance, i.e., to reregister the softgood on the computer.

It is also contemplated, as indicated in a block 56, that secondary services such as a marketing analysis may be supplied data concerning the transaction for developing statistics about users and softgoods purchased through the e-commerce server. Such data will be useful to creators of softgoods to track the interest and number of purchases of each softgood.

A successful transaction results in a dialog 48 being displayed by the player on the user's computer monitor 10, which indicates that the purchase has been completed and that the purchase price for the softgood has been charged to the credit account of the user. A control 50 enables a user to close this dialog. However, if the credit transaction was not approved by the credit card approval service, the e-commerce server sends a message to the player program causing it to open a dialog 52 advising the user that a problem has occurred in the credit transaction. The user is giving the opportunity to retry the purchase, perhaps entering a different card number, by activating a control 54. If the user chooses not to retry, control 50 may be activated to cancel the purchase transaction.

Figure 2:
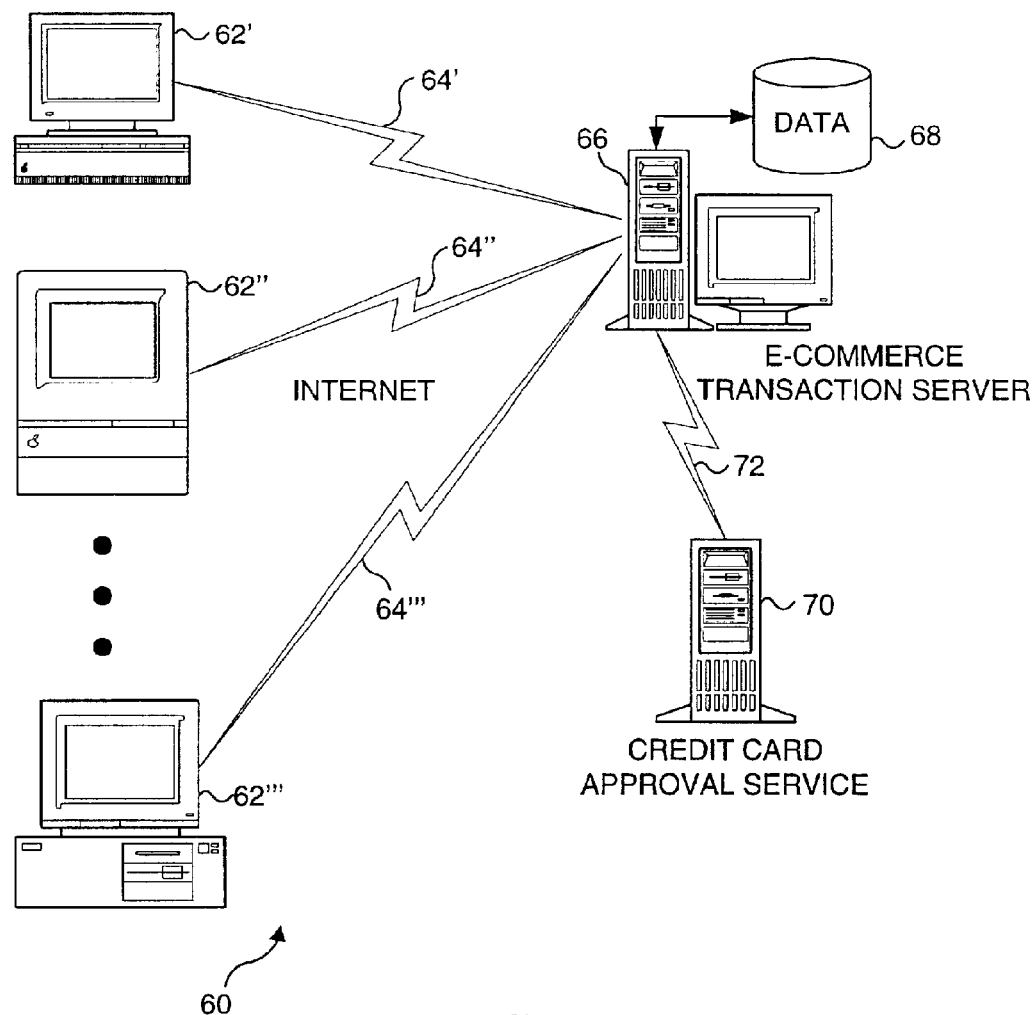
FIG. 2 is a schematic diagram of a portion of the Internet network, illustrating prospective purchaser computers of softgoods coupled in communication with an e-commerce server, and a credit card approval service.

FIG. 2 illustrates a system 60 in which a variety of different computers 62', 62", and 62'" are in use by prospective purchasers of softgoods and are connected through Internet links 64', 64", and 64'", respectively, to an e-commerce server 66. As each user attempts to make a purchase of a softgood, the e-commerce server communicates through an SSL Internet connection (or other type of secure connection) with a computer 70 at the credit card or other financial account approval service to determine if the purchase transaction is approved. Data including the credit card or financial account information for each user, the user ID, the softgood ID, and the softgood registration value or ID for softgoods purchased by each user are stored in database 68 that is maintained by the e-commerce server. While for purposes of simplifying the drawing, only three computers belonging to prospective softgood purchasers are shown within FIG. 2, it should be understood that many more computers may be linked to the e-commerce server through the Internet or other network at any one time.

Figure 3:
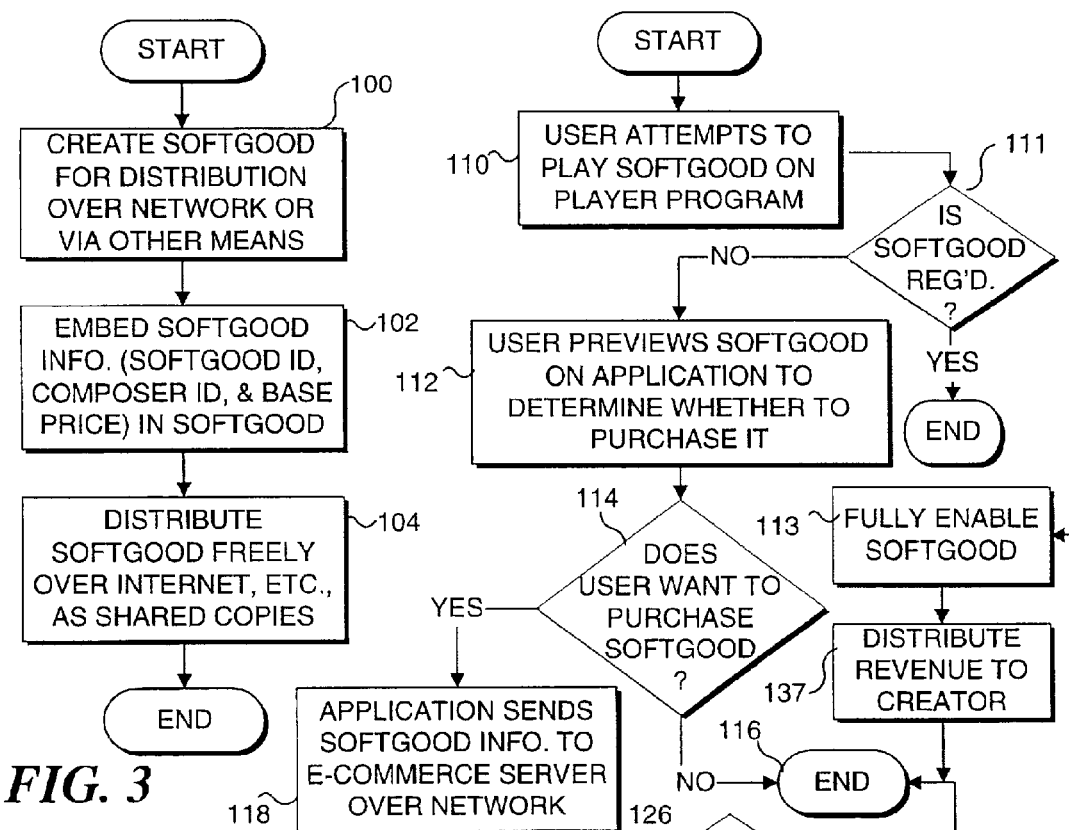
FIG. 3 is a flowchart showing the steps involved with distribution of softgoods.

Further details regarding the production and distribution of softgoods to be sold in accordance with the present invention are illustrated in a short flow chart shown in FIG. 3. As noted in a block 100, a composer or author creates the softgood for distribution to prospective purchasers over a network, such as the Internet, or by other means, as described above. Embedded within the softgood for the exemplary application of the present invention described above is softgood information, including the softgood ID, composer ID, and a base price, as provided in a block 102. As indicated above, the base price can be changed during the purchase transaction to reflect a changed value, as a function of marketing variables. It should also be noted that the distribution of a portion of the revenue generated by sale of a softgood that is distributed to the creator is also potentially modified with changes in the base price or as otherwise provided, e.g., in a distribution formula, within the agreement between the agency that has the e-commerce server and the creator.

An important underlying premise in the economic model used for marketing softgoods and selling them in accord with the present invention is that the softgoods be freely distributed over the Internet and through other distribution channels to provide as many shared copies of the softgood to prospective purchasers as possible, thereby maximizing the opportunity for preview and sale of the softgoods, as indicated in a block 104. The Internet or other network provides an expedient way to achieve this widespread distribution.

Figure 4:
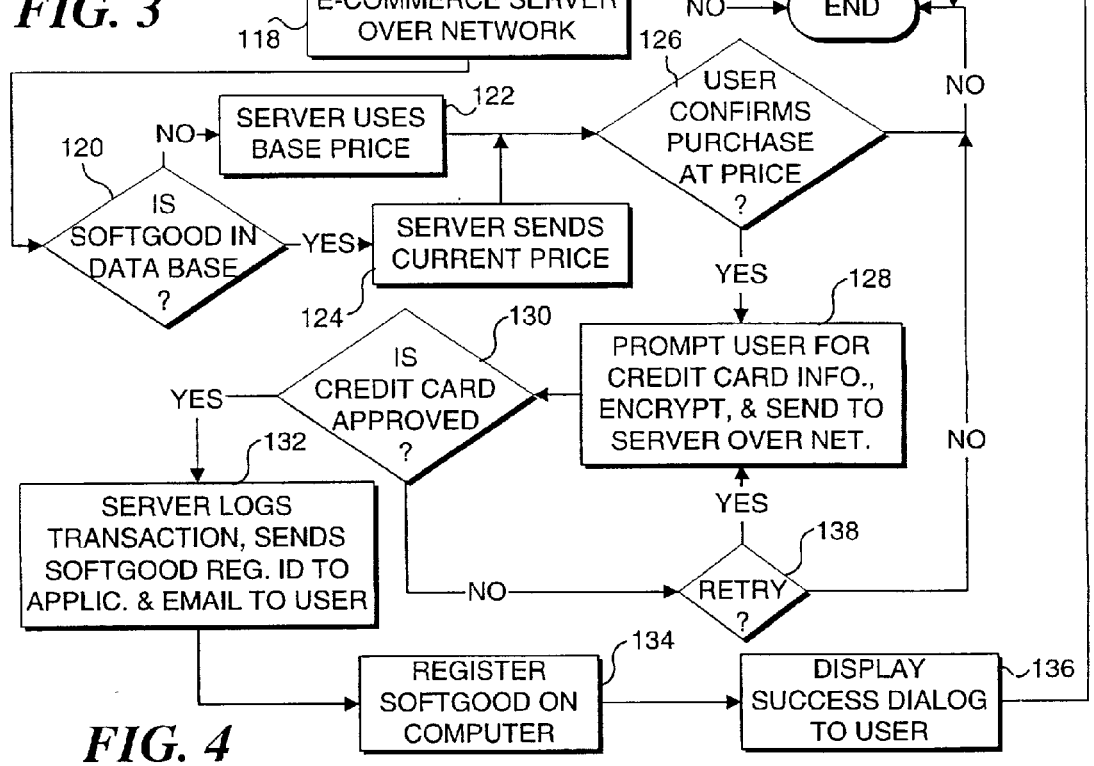
FIG. 4 is a flowchart illustrating the logical steps employed when a prospective purchaser previews and then purchases a softgood over a network.

The process for previewing and purchasing a softgood is illustrated in a flowchart shown in FIG. 4, beginning with a block 110 in which the user attempts to play a softgood acquired through the distribution scheme described above on the player program. It will be apparent that the user must already have the player program loaded and running on the user's computer to play the softgood. A decision block 111 determines if the softgood has already been properly registered on the user's computer. This decision block thus determines if: (1) the softgood was previously purchased by the user, and (2) the softgood was purchased using the same player program running on the same computer that the user is currently employing in the attempt to play the softgood. If the response to the determination in decision block 111 is affirmative, the user is enabled to play the softgood without any preview limitation, and the flow chart logic is concluded. It should be noted that the license to the softgood that was purchased by the user can limit the number of times that the softgood is played by the user or may impose a time limit during which the softgood can be played any number of times, but these license provisions should not to be confused with the limited preview discussed below.

If the softgood has not yet been registered on the computer on which the user is attempting to play the softgood, a block 112 indicates that the user has the opportunity to preview the softgood with the player program. Alternatively, if the user has previously purchased the softgood and it is not registered on the user's computer because the computer is a different computer, or the player program is a different computer, or due to loss of the registered status of the softgood, or for any other reason, the user may validate the prior purchase of the softgood by one of several different methods, including browsing to an alternate directory or volume in which other softgoods are registered and then validating the prior purchase and registration on the user's computer with reference to the user configuration for the other softgoods that were registered, or by manually entering the softgood registration value or ID (obtained from the user's records, as previously provided by the email from the server), or by verifying the prior purchase with the e-commerce server.

In a decision block 114, having previewed the softgood in accord with a limited preview, e.g., for a predefined number of times, or for a limited time interval, the user determines whether to purchase the softgood. A decision not to purchase leads to a block 116 in which the logic flow terminates. If the user elects to purchase the softgood, a block 118 provides that the player program sends the softgood information (including the softgood ID, the composer ID, and the base price) to the e-commerce server over the Internet (or other network). It is possible that the softgood being considered for purchase is not included in the database of the e-commerce server. A decision block 120 determines if the softgood data was included in the database maintained by e-commerce server and if the creator of the softgood has an agreement in place with the agency running the e-commerce server regarding sale of the softgood. While not shown here, it is possible that the creator of the softgood has not executed such an agreement or has revoked it, and if so, the process would terminate at this point. However, for the sake of this example, it will be presumed that the creator of the softgood has agreed that the agency running the e-commerce server shall handle purchases of softgoods produced by the creator. Thus, if the softgood is included in the database maintained by the e-commerce server, the e-commerce server sends the current price to the prospective purchaser over the Internet or other network, as indicated in a block 124. If the softgood is not currently included in the database, the e-commerce server uses the base price within the softgood, as indicated in a block 122, when registering the softgood within its database. A decision block 126 determines if the user will confirm the purchase of the softgood, since the current purchase price may be higher than expected, or the user may have decided not to consummate the purchase for some other reason. If the user still wishes to proceed with the purchase, a block 128 provides for prompting the user to enter a credit card or other financial account number, then the player program encrypts the financial account information and the user name on the account and sends that information to the e-commerce server over the network. If the user cancels the purchase, the process terminates at block 116.

In a decision block 130, the e-commerce server determines if the credit card or other financial account information has been approved by the approval agency and if so, a block 132 indicates that the e-commerce server logs the transaction and sends a softgood registration value or ID (which may be encrypted or encoded) to the player program, and optionally e-mails the registration value or ID to the user. In a block 134, the softgood is registered on the user's computer, e.g., by modifying the softgood to include the registration value and by making a corresponding entry in a softgood registration file on the computer. This registration is checked by the player program to determine if the user has rights to continue to use the softgood after the allowed preview has been completed. A block 136 provides for displaying a "success" dialog to the user, indicating that the purchase transaction has been successful. Thereafter, the program proceeds to a block 113, to fully enable use of the softgood by the player program (as permitted under the terms of the license purchased by the user). A block 137 provides that the e-commerce server arranges to distribute an agreed share of the revenue from the sale of the softgood to its creator. Following block 137, the flow chart logic terminates at block 116.

If, in decision block 130, the credit card or other financial account transaction is not approved by the approval agency, the logic proceeds to a decision block 138 and gives the user the opportunity to retry purchasing the softgood, possibly using a different financial account or to re-enter the previous credit card or other financial account number, since the user may previously have made an error in entering it. If the user chooses to retry the transaction, the logic returns to block 128. It should also be noted that if the user has already previously provided a credit card number that is stored by the e-commerce server, it may not be necessary to provide the credit card number during the current transaction to purchase the softgood. Instead, the user may simply confirm that the credit card or other financial account number previously provided be debited for the current purchase price of the softgood. In the event that the user does not elect to retry the purchase in decision block 138, the logic also terminates at block 116.

The present invention assumes that the softgoods will be freely distributed through rampant copying and other mass distribution techniques to ensure the widest possible preview of the softgoods, thereby tending to increase the numbers of prospective purchasers who will be interested in purchasing the softgoods. Softgoods are likely to be available from a variety of different sources, and will be readily downloaded and copied without involving the creator's source site in a subsequent purchase transaction, since the e-commerce server will handle all such transactions. By separating the distribution source from the e-commerce server that handles the purchase of the softgoods, the efficiency with which softgoods can be distributed for preview by prospective purchasers is greatly increased. Enabling users to preview softgoods ensures that prospective purchasers may make an informed decision as to whether to purchase the softgoods.

In most cases, it is likely that a softgood will be distributed and sold so that the license purchased will be without limitations on the purchaser making further modifications to the softgood. However, in some instances, a user may be precluded from making changes to the softgood that alter its original content, because the composer or author has elected that option during the composition of the softgood. Even if a softgood is altered by a purchaser, the softgood ID, user I), creator's name, and composer ID will be retained in the resulting derivative work softgood. A copy of such a derivative work softgood should not be used beyond the limited preview rights originally granted, unless purchased as described above, but this provision is not enforced by the player program.

If a softgood purchased by a user is transferred to a different computer for use by the user, the softgood will not be playable beyond the limited preview, even if the player program is also copied to the new computer. It will be necessary to register the softgood on the new computer to again have the full rights to play the softgood granted under the license that was purchased by the user. In the event that it was necessary to move the softgood to a new computer, or if the registration value was accidentally erased or otherwise lost, the user can enter the registration value previously received by email to reregister the softgood when asked by the player program to purchase that softgood. Also, since the purchase of a softgood is recorded in the database of the e-commerce server, the user can validate a prior purchase and register the softgood on a new computer by a connection with the e-commerce server over the Internet or other network.

As an alternative to encrypting the information transmitted to the e-commerce server during a purchase transaction, the player program may be provided with the SSL library for communications or other secure communication channel so that information transmitted to and from the e-commerce server will be secure. It is also contemplated that if the prospective purchaser has already provided a credit card number through a different secure communication channel, such as via mail or during a telephone call, there is no need to encrypt the communications between the player program running on a user's computer and the e-commerce server.

A less desirable alternative is to use a browser for transacting the purchase of a softgood by providing a URL within the player program, which when selected by a user, will open the user's preferred browser and connects to a web page for the e-commerce server. The user can then submit the required information for conducting the purchase of a softgood. The player can partially complete the form by filling in the identification of the softgood and possibly the user's name and other information. Further, if the user has already provided credit card or other financial account information to the e-commerce server through an alternative secure communication, there is no need to encode the information submitted with the browser to the e-commerce server.

In the event that the user contemplates purchasing a number of softgoods, it will be to the user's advantage to open an account with the e-commerce server, by providing the credit card or other financial account number that should be debited for each subsequent softgood purchase and other required information, such as a billing address. As will be apparent from the preceding discussion, by enabling the e-commerce server to store such information, there will be no need to send that information to the server for subsequent purchases of softgoods. Perhaps the most efficient way to provide this information to the e-commerce server is through an automated 800 number that the user calls to connect with the agency running the e-commerce server. An automated system at this agency can employ voice recognition to enable the user to speak the credit card number or other financial account information so that the information for entry into the database in connection with the user's name, address, and other personal data.

Computer Suitable for Implementing the Present Invention

Figure 5:
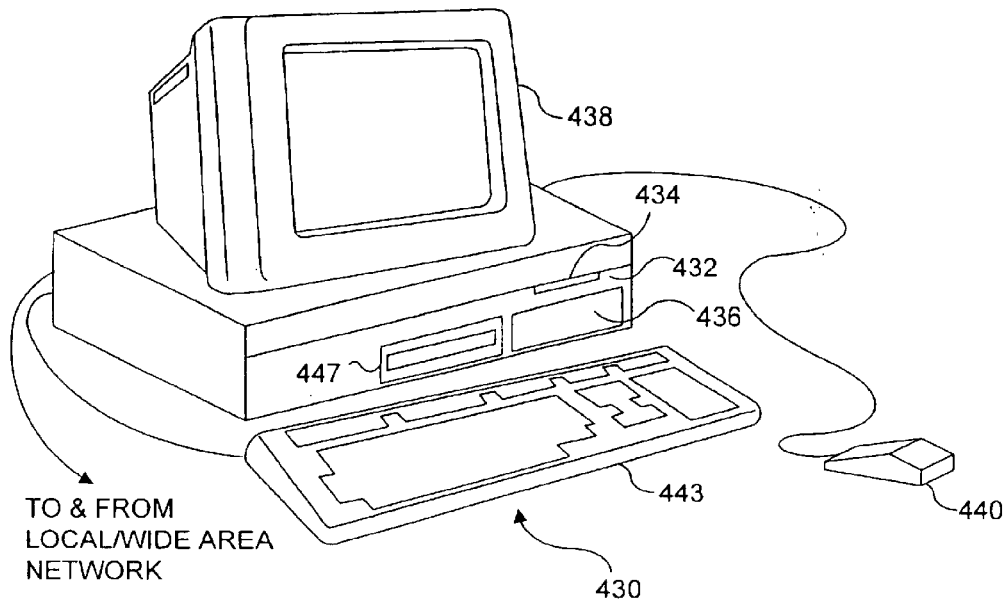
FIG. 5 is a schematic diagram of a generally conventional computer suitable for implementing the present invention, for use by a prospective purchaser, use by a creator of a softgood, and for use as an e-commerce server.

With reference to FIG. 5, a generally conventional computer 430 is illustrated, which is suitable for use in connection with practicing the present invention, both for executing the player program, which is used for playing and purchasing the softgoods and for carrying out the functions of the e-commerce server. Personal computer 430 includes a processor chassis 432 in which are mounted a floppy disk drive 434, a hard drive 436, a motherboard populated with appropriate integrated circuits (not shown), and a power supply (also not shown), as are generally well known to those of ordinary skill in the art. A monitor 438 is included for displaying graphics and text generated by software programs that are run by the personal computer. A mouse 440 (or other pointing device) is connected to a serial port (or to a bus port) on the rear of processor chassis 432, and signals from mouse 440 are conveyed to the motherboard to control a cursor on the display and to select text, menu options, and graphic components displayed on monitor 438 by software programs executing on the personal computer. In addition, a keyboard 443 is coupled to the motherboard for user entry of text and commands that affect the running of software programs executing on the personal computer.

Personal computer 430 also optionally includes a compact disk-read only memory (CD-ROM) drive 447 into which a CD-ROM disk may be inserted so that executable files and data on the disk can be read for transfer into the memory and/or into storage on hard drive 436 of personal computer 430.

A modem (not shown) may be installed in or connected to the personal computer, providing access to the Internet through a service provider (also not shown). It is also contemplated that other types of communication interfaces, such as an integrated services digital network (ISDN) adapter, cable modem, or a digital subscriber line could be used instead of the modem to provide higher speed data communications over the Internet. Computer 430 may instead be connected to the Internet via a local area network (LAN).

Figure 6:
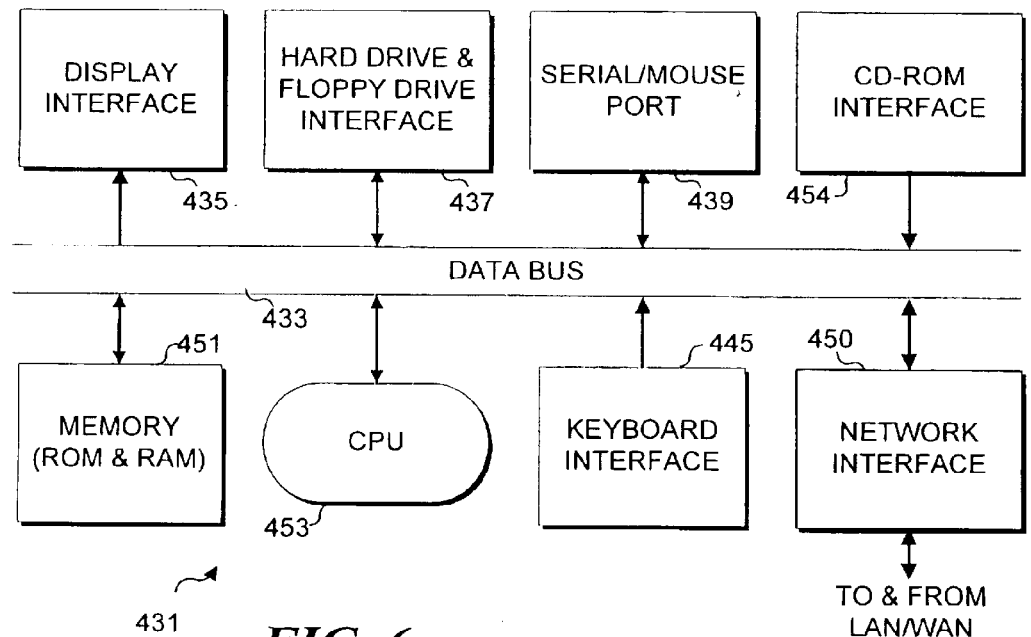
FIG. 6 is a functional block diagram of selected components of the computer shown in FIG. 5.

Although details relating to all of the components mounted on the motherboard or otherwise installed inside processor chassis 432 are not illustrated, FIG. 6 is a block diagram illustrating some of the functional components that are included. The motherboard includes a data bus 433 to which these functional components are electrically connected. A display interface 435, comprising a video card for example, generates signals in response to instructions executed by a CPU 453 that are transmitted to monitor 438 so that graphics and text are displayed on the monitor. A hard drive and floppy drive interface 437 is coupled to data bus 433 to enable bi-directional flow of data and instructions between data bus 433 and floppy drive 434 or hard drive 436. Software programs executed by CPU 453 are typically stored on either hard drive 436, or on a floppy disk (not shown) that is inserted into floppy drive 434. Alternatively, other types of data storage can be used for both programs, and data, including CD-ROMs, DVD disks, or other optical or magnetic storage media. The software program comprising the player application software used in the present invention will likely be distributed over the Internet, or on storage media disks such as CD-ROM's, and stored on hard drive 436 for execution by CPU 453. Similarly, distribution of the softgoods will likely be on-line or by exchange of storage media on which they have been copied.

A serial/mouse port 439 (representative of the two serial ports typically provided) is also bi-directionally coupled to data bus 433, enabling signals developed by mouse 440 to be conveyed through the data bus to CPU 453. Alternatively, if a different device such as an external modem or high-speed telephone line adapter is coupled to the serial port, data can be transmitted bi-directionally from the CPU to and from the Internet. A CD-ROM interface 454 connects CD-ROM drive 447 to data bus 433. The CD-ROM interface may be a small computer systems interface (SCSI) type interface or other interface appropriate for connection to and operation of CD-ROM drive 447. Other types of drives, such as DVD drives, may also be connected through an appropriate interface.

A keyboard interface 445 receives signals from keyboard 443, coupling the signals to data bus 433 for transmission to CPU 453. A sound card (not shown) is optionally connected to data bus 433 to convert digital audio signals used in multimedia applications (such as may be employed with the softgoods) to analog audio signals that are supplied to an amplifier and speaker system (also not shown).

When a software program is selected by a user to be executed by CPU 453, the machine instructions comprising the program that are stored on a floppy disk or on hard drive 436 are transferred into a memory 451 via data bus 433. Machine instructions comprising the software program are executed by CPU 453, causing it to implement functions determined by the machine instructions. Memory 451 includes both a nonvolatile read only memory (ROM) in which machine instructions used for booting up personal computer 430 are stored, and a random access memory (RAM) in which machine instructions and data are temporarily stored when executing application programs.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for facilitating automated sale of softgoods, comprising the steps of:
  (a) providing a creator program to a creator of the softgoods that automatically includes a unique identifier in each softgood before the softgood is distributed to prospective purchasers, said unique identifier specifically referencing the creator of the softgoods, the creator program producing softgoods that require the use of a player program to enable playback of softgoods authored with the creator program, the player program being configured to determine if the softgood is registered on the computing device on which the player program is installed before enabling playback of a softgood that was produced by the creator program, so that if a softgood is not registered on the computing device on which the player program is installed, the player program enables playback of said softgood in a demo mode, and if the softgood is registered on the computing device on which the player program is installed, the player program enables playback of said softgood in a full mode, wherein registration of the softgood is implemented by creating a registration value that is accessible by the computing device, a different registration value being created for each softgood registered on the computing device;
  (b) distributing the softgoods and the player program to prospective purchasers, such that the distribution is not limited to a distribution over private networks; and
  (c) providing an agency having a server that implements softgood purchase transactions and maintains a database in which data relating to the sale of softgoods are stored, unique identifiers of the softgoods being referenced in the database to track the softgood purchase transactions, such that for softgoods that are purchased, the database maintains data relating to purchasers of the softgoods for as long as the agency is managing purchases of the softgoods, said agency responding to a purchase of a softgood by transmitting the registration value in its entirety and independently of the softwood to a first computing device used to initiate the purchase, the registration value transmitted by the agency identifying the softgood that was purchased, so, that a first copy of the player program installed on the first computing device will recognize that the softgood that was purchased is registered on the first computing device and thus enable playback of the softgood that was purchased in the full mode, whereas a second copy of the player program installed on a different computing device does not enable playback of the softgood that was purchased in the full mode, unless the registration value for the softgood that was purchased is provided to the different computing device, thereby registering the softgood that was purchased on the different computing device, the registration value transmitted in its entirety by the agency in response to a purchase being the only data required by the player program to enable playback of the purchased softgood in the full mode.

2. The method of claim 1, wherein the unique identifier for each softgood also references a unique identifier for the creator program provided to the creator and used to create the softgood, the unique identifier distinguishing the specific copy of the creator program used by the creator from all other copies of the creator program.

3. The method of claim 1, wherein the creator program automatically communicates the unique identifier for the softgood over a network to the server for storage in the database.

4. The method of claim 1, wherein the unique identifier of the softgood is communicated to the agency for storage in the database by the server during the purchase transaction for said softgood.

5. The method of claim 1, further comprising the step of automatically including a base price within each softgood prior to the step of distributing the softgoods.

6. The method of claim 1, wherein the registration value for the purchased softgood transmitted by the agency includes an identity of the purchaser, so that the registration value for the softgood that was purchased cannot be registered on an additional computing device to enable a copy of the player program installed on the additional computing device to playback the softgood in the full mode, unless the purchaser is identified as an authorized user of the additional computing device.

7. The method of claim 1, wherein the unique identifier for a softgood is communicated to the agency and entered into the database when the softgood is first purchased.

8. A method for facilitating purchase of a softgood that is freely distributed to prospective purchasers for preview within a player program and which includes a unique identifier that is assigned to the softgood before the softgood is distributed, comprising the steps of:
(a) enabling prospective purchasers to preview the softgood with the player program to a limited extent, prior to deciding to purchase the softgood, wherein during such preview, a prospective purchaser possesses a complete copy of the softgood, regardless of how the softgood was obtained, but the player program controls access to the softgood and allows the prospective purchaser only limited access to the softgood, the player program being configured to determine if the softgood is registered on the computing device on which the player program is installed before enabling, playback of a softgood, so that if a softgood is not registered on the computing device on which the player program is installed, the player program enables playback of said softgood in a demo mode, and if the softgood is registered on the computing device on which the player program is installed, the player program enables playback of said softgood in a full mode, wherein registration of the softgood is implemented by creating a registration value that is accessible by the computing device;
(b) enabling purchase of the softgood from within the player program by connecting a computer on which the player program is executing with an e-commerce agency to initiate a network transaction, purchase of the softgood causing data related to the purchase to be recorded in a database of the e-commerce agency and causing the e-commerce agency to transmit a registration value in its entirety and independently of the softwood to the computer on which the player program is executing, the registration value being based in part on the unique identifier, a different registration value being provided for each softgood that is purchased, such that the only data the player program requires to enable playback of the softwood in the full mode is the registration value transmitted by the e-commerce agency; and
(c) registering the softgood on the computer employed for the network transaction using the registration value provided by the e-commerce agency, each registration value received being added to a softgood registration file stored on the computer employed for the network transaction, registration of the softgood on the computer enabling the softgood to be played by the player program beyond the limited extent of the preview, the program player thereafter allowing a purchaser who has thus purchased the softgood to fully access the softgood.

9. The method of claim 8, further comprising the step of including at least one of an identification of a creator of the softgood, an identification of a specific copy of a software product used to produce the softgood, and a price in the softgood, prior to its distribution.

10. The method of claim 8, further comprising the steps of using the player program to transmit an identification of a purchaser of the softgood to the e-commerce agency during the network transaction, to enable the e-commerce agency to debit a financial account of the purchaser for a purchase price of the softgood.

11. The method of claim 10, wherein financial account numbers of purchasers of softgoods are stored in the database, a financial account number of a purchaser being used to debit an account of said purchaser as a result of the network transaction.

12. The method of claim 8, wherein the step of registering comprises the step of modifying the softgood to include the registration value and recording the registration value in a file, said registration value referencing at least one of an identification of the player program, an identification of the user, and the unique identifier for the softgood.

13. The method of claim 8, further comprising the step of including a prohibition of a purchaser modifying the softgood within the softgood.

14. The method of claim 8, further comprising the step of registering each instance of the player program with a player identification in the database of the e-commerce agency.

15. The method of claim 14, wherein the registration value comprises a combination of at least two of: the unique softgood identification, the player identification, and an identification of the purchaser of the softgood.

16. The method of claim 8, wherein the softgood is not usable on the computer for more than a predefined number of times, unless registered on the computer.

17. The method of claim 8, wherein the step of enabling prospective purchasers to preview the softgood comprises the step of permitting the softgood to be played with only a substantially reduced quality, unless registered on the computer.

18. The method of claim 8, further comprising the step of sending a message over the network to advise a purchaser of the registration value that was used to register the softgood on the computer of the purchaser.

19. A method for controlling play of a softgood on a computer using a player program, said player program also being employed to purchase the softgood through a network transaction, comprising the steps of:
(a) enabling a user to preview the softgood on the computer within the player program, the player program being configured to determine if the softgood is registered on the computer on which the player program is installed before enabling playback of a softgood, so that if a particular softgood is not registered on the computer on which the player program is installed, the player program enables playback of the particular softgood in a demo mode, and if the particular softgood is registered on the computer on which the player program is installed, the player program enables playback of the particular softgood in a full mode, wherein the registration is implemented by providing a registration, a different registration value being required for each softgood; and
(b) enabling the user to purchase the softgood through a transaction conducted from within the player program, such that after the user has purchased the softgood, the softgood is registered on the computer using a registration value provided during the network transaction, said registration value being transmitted in its entirety and independently of the softwood to the computer during the network transaction, said registration value being based in part on a unique identifier for the softgood provided by a software program used to create the softgood, each registration value received being added to a softgood registration file stored on the computer, registration of the softgood on the computer providing access to the softgood in accord with a license to the softgood so that it is thereafter playable on the computer with the player program beyond a preview limit, the registration value that is stored in the softgood registration file for the particular softwood being the only data required by the player program to enable playback of the particular softgood in the full mode.

20. The method of claim 19, wherein if the softgood is transferred to a different computer after being purchased, the softgood must again be registered on the different computer to enable the softgood to be played beyond the preview limit on the different computer.

21. The method of claim 19, wherein the registration value is further based on at least one of:

(a) name of the purchaser of the unencrypted softgood;

(b) a unique identifier for the player program; and (c) an identifier for a creator of the softgood.

22. The method of claim 19, wherein the step of enabling the user to purchase the softgood through a transaction conducted from within the player program comprises the steps of:

(a) confirming that a financial account number provided by a purchaser is valid and is approved for purchase of the softgood by checking the financial account number with an approval service during the transaction; and if the financial account number is valid and approved, (b) transmitting the registration value to the purchaser; and if not, (c) advising the purchaser that purchase of the softgood was disapproved.

23. The method of claim 19, further comprising the step of maintaining a database on an e-commerce server in which an identification of each purchaser and a list of each softgood purchased by each purchaser are included, to facilitate distribution of at least a portion of the purchase price of the softgood to a creator of the softgood, and to store the registration value so that the purchaser can again reregister the softgood on a computer if the registration of the softgood on the computer is lost.

24. The method of claim 23, wherein data stored in the database also include a financial account number for each purchaser of softgoods, said financial account numbers being provided by the purchasers, further comprising the step of charging the financial account referenced by the financial account number of a purchaser during the transaction.

25. The method of claim 24, further comprising the step of encrypting the financial account number for transmittal over the network to the database.

26. The method of claim 25, wherein the player program is used to encrypt a communication for transmission over the network during the transaction.

27. The method of claim 23, wherein the database also includes a current price for each softgood, further comprising the step of advising a purchaser of the current price of the softgood being purchased during the transaction.

28. The method of claim 19, further comprising the step of employing the player program to transmit information over a network to an e-commerce agency to implement purchase of a softgood, using a secure communication protocol.

29. A system for facilitating purchase of a softgood of which copies are freely distributed to prospective purchasers for preview prior to purchase, said softgood having a unique identifier that is included within the softgood before its distribution, comprising:

(a) a purchaser computer that includes a first processor, a first memory in which a plurality of machine instructions are stored that implement a plurality of functions when executed by the processor, a first network interface coupling the computer in communication with a network, at least one user interface for input of data to the memory, and a display on which graphics and text are displayed;

(b) a remote computer that includes a second processor, a second memory in which are stored a plurality of machine instructions that implement a plurality of functions when executed by the second processor, and in which a database containing data relating to purchases of softgoods are stored, a second network interface coupling the remote computer in communication with the network and thereby selectively coupling the remote computer in data communication with the purchaser computer via the network;

(c) a softgood comprising machine instructions or media data that are loaded into the first memory of the purchaser computer, the softgood not including any copy protection that prohibits the softgood from being freely copied and freely distributed, other of the machine instructions stored in the first memory comprising a player program that uses the softgood, said player program carrying out a plurality of the functions when the machine instructions of the player program are executed by the first processor, including:

(i) enabling the softgood to be previewed to a limited extent prior to the user purchasing the softgood;

(ii) enabling the user to purchase the softgood in a transaction with the remote computer that is conducted over the network;

(iii) registering the softgood on the purchaser computer after the softgood has been purchased, said softgood being thus registered using a registration value provided by the remote computer, each registration value received being added to a registration file stored on the purchaser computer; and (iv) checking for a registration of the softgood on the purchaser computer and enabling the softgood to be used by the player program beyond the limited extent of the preview only if the softgood is determined to be registered on the purchaser computer, such that access to the registration value verifies that the softgood is registered, the registration value being the only data required by the player program to enable playback of the softgood beyond the limited extent of the preview; and (d) wherein said plurality of functions implemented by said second processor in the remote computer include:

(i) responding to a request to purchase the softgood received over the network from the purchaser computer;

(ii) confirming an approval of a credit purchase by the user of the purchaser computer with a credit approval agency that is coupled to the network;

(iii) determining the registration value as a function of at least the unique identifier of the softgood and sending the registration value in its entirety and independently of the softgood to the purchaser computer over the network to register the softgood on the purchaser's computer, each registration value received being added to the registration file stored on the purchaser computer; and (iv) allocating a portion of a purchase price of the softgood set by terms of a prior agreement to a creator of the softgood.

30. The system of claim 29, wherein the plurality of functions implemented by the second processor include:

(a) checking the data stored in the database to determine if data for the user purchasing a softgood are already included within the database; and if so, (b) using a financial account number included in the data for implementing the purchase of the softgood; and (c) storing the unique identifier for the softgood purchased in association with the user, within the data of the database.

31. The system of claim 29, wherein the registration value is further based on at least one of:

(a) a user identifier that identifies the purchaser of the softgood;

(b) an identifier for the creator of the softgood;

(c) a unique identification for the player program; and (d) an identification of the purchaser of the softgood.

32. A system for facilitating automated sale of softgoods from which a revenue stream is returned to each creator of the softgoods, each softgood including a unique identifier, comprising:

(a) creator computers that execute at least one software program used by creators of the softgoods to produce the softgoods and to assign the unique identifier to the softgoods produced thereby, said creator computers including network interfaces that couple the creator computers to a publicly accessible network, the creators of the softgoods entering into agreements with an e-commerce agency in which the e-commerce agency agrees to facilitate the automated sale of the softgoods and to return a portion of the revenue stream from the automated sale to the creators of the softgoods; and (b) a server computer operated by the e-commerce agency, said server computer maintaining a database in which data relating to the softgoods are stored, said data including unique identifiers for the softgoods, said server computer also including a network interface coupling the server computer in communication with the publicly accessible network and being configured to receive the unique identifier for each softgood from each of:

(i) the creator computers before distribution of the softgood to prospective purchasers; and (ii) a user of the softgood at a sale of the softgood, a purchase of a softgood being initiated when a softgood is being used, said purchase by a user of the softgood causing the server computer to confirm approval of a credit transaction for the user by an on-line communication with a credit approval agency, and if the credit transaction is approved, to transmit a registration value in its entirety and independently of the softgood over the publicly accessible network to a computer of the user to register the softgood on the computer of the user, and to enter data related to the purchase within the database, each registration value received being added to the computer of the user, a presence of a registration value corresponding to a specific softgood being the only data required to enable playback of the specific softgood in a full mode, an absence of a registration value corresponding to the specific softgood enabling playback of the softgood only in a demo mode.

33. The system of claim 32, wherein the registration value is based upon at least one of the user's name, the unique identifier for the softgood, an identifier for the creator of the softgood, and a unique identification of a player program that is executed on the computer of the user to play the softgood.

34. The system of claim 32, wherein each of the softgoods includes at least one of an identification of a specific copy of the software program used to produce the softgood, an identification of the creator of the softgood, and a price of the softgood.

35. The system of claim 32, wherein the server computer sends a current price to the user before the purchase is completed, said current price being stored in the data of the database.

36. The system of claim 32, wherein the softgood enables the user to purchase the softgood while the softgood is being executed on the computer of the user.

37. The system of claim 32, wherein a player program that is used to play the softgood communicates with the server computer over the network to facilitate the purchase of the softgood.

38. The system of claim 32, wherein a preview of the softgood to a limited extent is permitted on the computer of the user before the softgood is purchased, and once the softgood is registered on the computer of the user using the registration value, use of the softgood on the computer of the user is permitted to an extent determined by a license of the softgood.

39. A method for facilitating automated sale of softgoods, comprising the steps of:

(a) providing to a creator of the softgoods a composer program that automatically includes a unique identifier in each softgood before the softgood is distributed to prospective purchasers, said unique identifier specifically referencing the creator of the softgoods, such that softgoods created using the composer program:

(i) require a player program to be accessed; and (ii) do not include any copy protection that prohibits the softgood from being freely copied and freely distributed;

(b) providing an agency that implements softgood purchase transactions and maintains a database in which data relating to the sale of softgoods are stored, unique identifiers of the softgoods being referenced in the database to track the softgood purchase transactions, such that whenever a softgood is purchased, the agency provides a registration value in its entirety and independently of the softgood to a computing system used to purchase the softgood, the registration value being based at least in part on the unique identifier for the softgood purchased, the registration value being the only data required by the player program to enable full access to the softgood;

(c) providing the player program to prospective purchasers, such that each time the player program is used to play a softgood created using the composer program, the player program automatically:

(i) checks the computing system on which the player program is executing, to determine if a registration value corresponding to the unique identifier for the softgood has been provided to said computing system to register the softgood on the computing system, and if so, plays the softgood, providing access to its full range of benefits; but (ii) if the registration value has not been provided to the computing system, only enables playing of the softgood in a preview mode, and prompts a user to purchase the softgood in a transaction with the agency; and (d) distributing the softgoods to prospective purchasers, such distribution not being limited to distribution over a private network.

40. The method of claim 39, wherein if the registration value has not been provided to the computing system, the player program automatically communicates with the agency to determine if the unique identifier for the softgood is associated with a purchase of the softgood made by a purchaser who is an authorized user of the computing system on which the player program is resident, and if so, plays the softgood with its full range of benefits.

41. A system for facilitating purchase of a softgood of which copies are freely distributed to prospective purchasers for preview prior to purchase, said softgood having a unique identifier that is included within the softgood before its distribution, comprising:

(a) a purchaser computer that includes a first processor coupled to a first memory in which a plurality of machine instructions are stored that implement a plurality of functions when executed by the first processor, a first network interface coupling the purchaser computer in communication with a network, at least one user interface for input of data to the first memory, and a display on which graphics and text are displayed;

(b) a remote computer that includes a second processor coupled to a second memory in which are stored a plurality of machine instructions that implement a plurality of functions when executed by the second processor, and in which a database containing data relating to purchases of softgoods are stored, a second network interface coupling the remote computer in communication with the network and thereby selectively coupling the remote computer in data communication with the purchaser computer via the network;

(c) the softgood comprising machine instructions or media data that are loaded into the first memory of the purchaser computer and not including any copy protection that prohibits the softgood from being freely copied and freely distributed, wherein other of the machine instructions stored in the first memory comprise a player program that uses the softgood, said player program causing the first processor to carry out a plurality of the functions when the machine instructions of the player program are executed by the first processor, including:

(i) determining if a registration value corresponding to the unique identifier of the softgood that is to be played has been provided to the purchaser computer, and if so, playing the softgood so as to provide access to its fill range of benefits;

(ii) if a registration value corresponding to the unique identifier of the softgood that is to be played has not been provided to the purchaser computer, communicating with the database on the remote computer over the network to determine if an authorized user of the purchaser computer has previously purchased the softgood that is to be played, and if so, playing the softgood so as to provide access to its full range of benefits; and (iii) if a registration value corresponding to the unique identifier of a softgood that is to be played has not been provided to purchaser computer on which the player program is resident, and if no authorized user of the purchaser computer has previously purchased the softgood that is to be played, playing the softgood so as to provide a limited access, to enable a preview of the softgood, and enabling a user of the purchaser computer to purchase the softgood in a transaction with the remote computer that is conducted over the network, such that when a softgood is purchased, a registration value corresponding to the unique identifier of a softgood is received with the softgood; and (d) wherein said plurality of functions implemented by said second processor in the remote computer include:

(i) responding to a request to purchase the softgood received over the network from the purchaser computer;

(ii) confirming an approval of a credit purchase by the user of the purchaser computer with a credit approval agency that is coupled to the network;

(iii) determining the registration value as a function of at least the unique identifier of the softgood;

(iv) sending the registration value in its entirety and independently of the softgood to the remote computer over the network to register the softgood on the purchaser's computer, the registration value being the only data required by the player program to enable the player program to play the softgood so as to provide its full range of benefits; and (v) allocating a portion of a purchase price of the softgood set by terms of a prior agreement to a creator of the softgood.

* * * * *

UNITED STATES PATENT AND TRADEMARK OFFICE
CERTIFICATE OF CORRECTION

PATENT NO. : 6,882,979 B1
DATED : April 19, 2005
INVENTOR(S) : Reay et al.

It is certified that error appears in the above-identified patent and that said Letters Patent is hereby corrected as shown below:

Title page,
Item [73], Assignee, "Onadine, Inc." should read -- Onadime, Inc. --.

Column 8,
Line 51, "e-cornmerce" should read -- e-commerce --.

Column 13,
Line 20, "I)" should read -- ID --.

Column 19,
Line 63, "Claim 19" should read -- Claim 23 --.

Signed and Sealed this

Twenty-third Day of August, 2005

JON W. DUDAS
*Director of the United States Patent and Trademark Office*